(12) United States Patent
O'Reilly et al.

(10) Patent No.: US 6,888,442 B1
(45) Date of Patent: May 3, 2005

(54) SUBSTRATE/DOCUMENT AUTHENTICATION USING RANDOMLY DISPERSED DIELECTRIC COMPONENTS

(75) Inventors: Michael P. O'Reilly, Melbourne, FL (US); Robert W. Boyd, Eidson, TN (US)

(73) Assignee: Harris Corporation, Melbourne, FL (US)

( * ) Notice: Subject to any disclaimer, the term of this patent is extended or adjusted under 35 U.S.C. 154(b) by 402 days.

(21) Appl. No.: 09/140,151

(22) Filed: Aug. 28, 1998

(51) Int. Cl.[7] .............................................. G08B 13/14
(52) U.S. Cl. ........................ 340/5.2; 235/382; 340/5.86
(58) Field of Search ............................... 340/5.2, 572.1, 340/5.86, 572.5; 156/89.12, 345; 235/380, 382, 451, 487, 488; 283/83

(56) References Cited

U.S. PATENT DOCUMENTS

| | | | |
|---|---|---|---|
| 4,218,674 A | * 8/1980 | Brosow et al. | 340/5.86 |
| 4,591,189 A | * 5/1986 | Holmen et al. | 283/83 |
| 4,620,727 A | * 11/1986 | Stockburger et al. | 235/380 |
| 4,661,983 A | 4/1987 | Knop | 382/1 |
| 4,662,653 A | 5/1987 | Greenaway | 283/91 |
| 4,816,657 A | * 3/1989 | Stockburger et al. | 235/382 |
| 4,970,495 A | * 11/1990 | Matsumoto et al. | 340/572.1 |
| 5,204,681 A | 4/1993 | Greene | 342/51 |
| 5,218,472 A | 6/1993 | Jozefowicz et al. | 359/584 |
| 5,291,205 A | 3/1994 | Greene | 342/44 |
| 5,456,498 A | 10/1995 | Greene | 283/70 |
| 5,549,953 A | 8/1996 | Li | 428/64.1 |
| 5,781,110 A | * 7/1998 | Habeger et al. | 340/572.5 |
| 6,072,394 A | * 6/2000 | Hasegawa et al. | 340/572.5 |
| 6,168,080 B1 | * 1/2001 | Verschuur et al. | 235/451 |

OTHER PUBLICATIONS

Two Page technical sheets from Doyle Argosy Innovators entitled "Capacitive Swipe Verifier System".

* cited by examiner

*Primary Examiner*—Michael Horabik
(74) *Attorney, Agent, or Firm*—Allen, Dyer, Doppelt, Milbrath & Gilchrist, P.A.

(57) ABSTRACT

A document verification scheme embeds in or deposits on a substrate/document a random distribution of dielectric particles that effectively create a unique electronically detectable signature. The dielectric constant of the particles is sufficiently larger than that of the substrate/document, so as to exhibit molecular level electric dipole moments, which cause a detectable modification of an external electric field passing through the substrate. Electronic signature verification is effected by comparing the digitized output of an electric field modification sensor with a digital code that has been stored previously in the data base. As long as the substrate containing the dielectric particle signature has not been altered, its randomly distributed capacitance characteristic will remain unchanged, and the two digital signatures seen by the comparator will effectively match one another, verifying authentication of the substrate. However, alteration of the substrate and thereby the particle distribution will modify the capacitance characteristic associated with the randomly distributed particles and cause the comparator to be presented with two diverse digital signatures—indicating tampering.

15 Claims, 3 Drawing Sheets

SUBSTRATE/DOCUMENT AUTHENTICATION USING RANDOMLY DISPERSED DIELECTRIC COMPONENTS

FIELD OF THE INVENTION

The present invention relates in general to substrate verification systems, and is particularly directed to a new and improved technique for verifying the authenticity of a substrate, such as an identification badge, financial document, currency, passport and the like, by randomly dispersing a plurality of dielectric elements within the substrate, so as to fixate a unique, electrostatically verifiable signature within the substrate. A digital code representative of this signature is stored in a digital database and is compared with the embedded signature to verify the authenticity of the substrate or to show evidence of tampering.

BACKGROUND OF THE INVENTION

A variety of entities, such as, but not limited to government/military agencies, hospitals, manufacturers, and financial institutions, customarily issue various types of substrates (e.g., documents) that incorporate one or more inspectable security features (such as microprints, watermarks, threads, and the like), that serve to provide evidence of authenticity and/or tampering/counterfeiting, and thereby enable a recipient to determine whether the substrate is valid for its intended purpose.

Unfortunately, the continuously expanding degree of sophistication of tampering and counterfeiting threats to such security measures has not only resulted in a substantial increase in the complexity and cost of such visual security features, but has reached a point of diminishing returns in which the degree of security is degraded. For non-limiting examples of previously proposed document security measures, attention may be directed to the following U.S. Pat. Nos.: 4,661,983; 5,549,953; 4,662,653; 5,218,472; 5,456,498; 5,291,205; and 5,204,681.

SUMMARY OF THE INVENTION

In accordance with the present invention, the shortcomings of such conventional document verification schemes are effectively obviated by embedding within or depositing on the substrate a random distribution of dielectric components or particles that effectively affix a unique electronic signature within the substrate. The embedded dielectric components have a dielectric constant that is sufficiently larger than that of the substrate/document to exhibit molecular level electric dipole moments that modify an external electric field passing through the substrate. Because the distribution of dielectric particles is fixed in a random distribution within the substrate, it constitutes a detectable electronic 'signature' that is unique to that particular substrate.

As a non-limiting example, the substrate may be formed as a laminate structure having an interior carrier layer that is laminated between a pair of outer substrate layers. The distribution of dielectric components may be applied to the carrier layer by a variety of conventional material application methods, such as, but not limited to printing, adhesive affixation and sputtering. Where the deposition method allows controlled spatial placement of the dielectric material, a non-random pattern may be deposited in addition to the random pattern. This non-random pattern may be used to store prescribed information in the substrate, such as an identification code or 'start of synchronization' pattern, as non-limiting examples.

To read the embedded electronic signature, an electric field may be generated by means of a pair of spaced apart electrodes which are coupled to an electrical charge source. Coupled in parallel with the electrodes is a voltage sensor which monitors the voltage across the electrodes. Due to the random distribution of dielectric particles within the substrate, translating the substrate between the electrodes will modify the electric field and thereby cause the output of the voltage sensor to vary in proportion to the variation in capacitance of the substrate associated with the 'signature' of the randomly distributed dielectric particles. This output is digitized into a series of digital code words and stored in a digital data base.

Electronic signature verification is readily effected by means of a comparator coupled to compare the digitized output of a sensor with a digital code that has been stored previously in the data base. As long as the substrate containing the dielectric particle signature has not been physically altered, its randomly distributed capacitance characteristic will remain unchanged, so that the two digital signatures seen by the comparator will effectively match one another, verifying authentication of the substrate. However, physical alteration of the substrate will modify the randomly distributed capacitance characteristic associated with the particles within the substrate and cause the comparator to be presented with two diverse digital signatures—indicating tampering. The manner in which the variation in capacitance along the substrate is sensed may take a number of variations, including sensing a variation in AC voltage and frequency discrimination.

DETAILED DESCRIPTION

Figure 1:
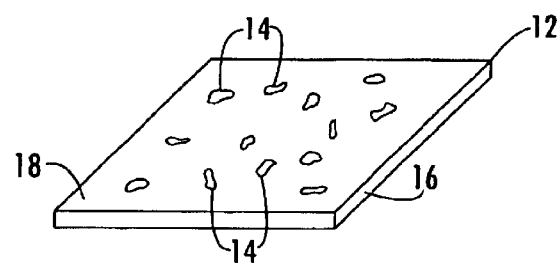
FIG. 1 diagrammatically illustrates a substrate containing a dielectric particle-based security signature in accordance with the present invention.

Before describing in detail the new and improved substrate/document verification system in accordance with the present invention, it should be observed that the invention resides primarily in what is effectively a prescribed arrangement of commercially available components, circuits and associated digital signal processing and data storage units, and attendant supervisory control circuitry therefor, that controls the operations of such circuits and components. Consequently, the configuration of such circuits and components and the manner in which they are interfaced with other equipment have, for the most part, been illustrated in the drawings by readily understandable diagrams, which show only those specific details that are pertinent to the present invention, so as not to obscure the disclosure with details which will be readily apparent to those skilled in the art having the benefit of the description herein.

Figure 2:
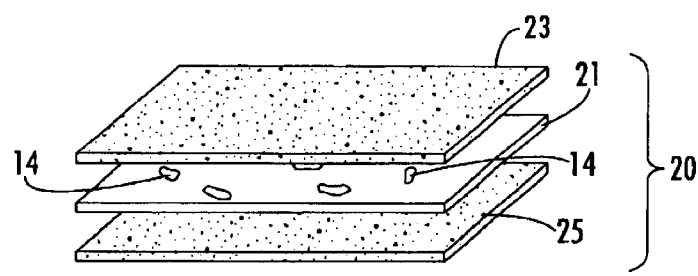
FIG. 2 shows a laminate substrate structure having an interior dielectric particle carrier layer laminated between a pair of outer substrate layers.

As described briefly above, and as is diagrammatically illustrated in FIG. 1, the substrate/document verification system of the present invention embeds a security signature in or on a substrate 12, such as but not limited to a document, card and the like, in the form of a distribution of dielectric components 14 that are embedded within the interior 16 of or affixed to a surface 18 of the substrate 12. As a non-limiting example, as shown in FIG. 2, where the substrate 12 comprises a document, it may be formed as a laminate structure 20 having an interior carrier layer 21 of a material such as polyester, having a thickness $t_c$ on the order of 0.5–2.0 mils, that is laminated or 'sandwiched' between an upper substrate layer 23 and a lower substrate layer 25. Each of the upper and lower substrate layers 23 and 25 may comprise a material such as polyvinyl chloride (PVC) or polyester, having a thickness $t_s$ on the order of 10–30 mils. This results in an overall document thickness $t_m$ on the order of 10–30+mils.

Figure 3:
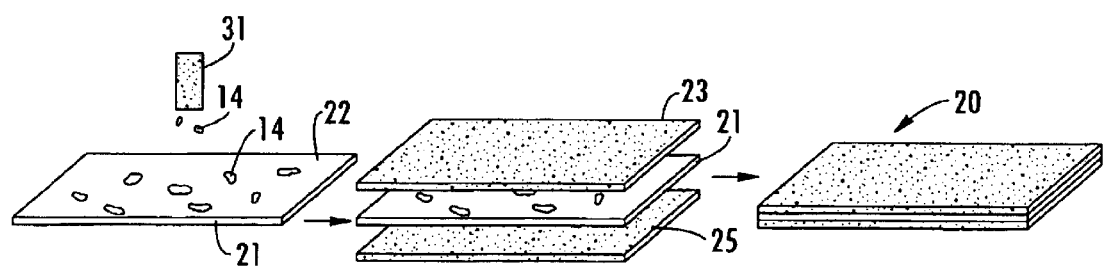
FIG. 3 diagrammatically illustrates sputtering of dielectric particulates onto a substrate carrier.

In the laminate structure of FIG. 2, the distribution of dielectric components 14 may be applied to the carrier layer 21 by a variety of conventional material application methods, such as, but not limited to printing, adhesive affixation and sputtering. Where the deposition method (e.g., printing) allows controlled spatial placement of the dielectric material, a non-random pattern may be deposited in addition to the random pattern. Such a non-random pattern may be employed to impart prescribed information to the substrate, such as an identification code or 'start of synchronization' pattern, as non-limiting examples.

Where sputtering is employed, as diagrammatically illustrated in FIG. 3, a dielectric material such as barium titanate (BaTiO$_3$) may be deposited from a sputtering head 31, as the carrier layer 21 is translated past the head, thereby forming a layer of dielectric particles 14 randomly distributed on the surface 22 of the carrier layer 21. The thickness $t_d$ of the dielectric material 14 is considerably less than that $t_m$ of the document 20, and may be on the order of 0.1 mil. Also, the material of which the dielectric particles 14 is comprised has a dielectric constant that is sufficiently greater than that of the carrier layer 21 and the layers 23 and 25, such that, within the laminate structure, the dielectric particles 14 will exhibit molecular level electric dipole moments, that cause a detectable modification of an external electric field passing through the laminate substrate in accordance with the particle distribution.

For this purpose, the dielectric constant ed of the dielectric particles 14 is preferably at least an order of magnitude greater than the average dielectric constant em of the substrate/document 12. For the above example, the carrier layer 21 may have a dielectric constant on the order of 2–3 and each of the layers 23 and 25 may have a dielectric constant on the order of 2–3. On the other hand a dielectric material such as BaTiO$_3$ has a dielectric constant on the order of 500–5000.

Figure 4:
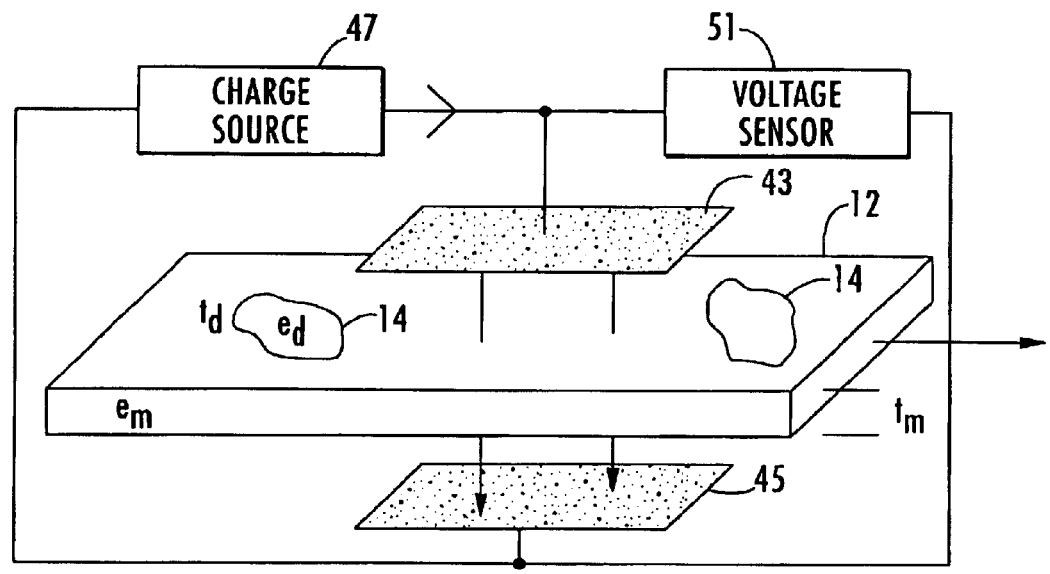
FIG. 4 shows an arrangement for generating an electric field to measure variation in capacitance of a substrate containing a dielectric particle-based security signature in accordance with the present invention.

As shown in FIG. 4, an electric field 41 may be generated by means of a pair of electrodes, shown as spaced apart conductive plates 43 and 45, which are coupled to an electrical charge source 47 (e.g., controlled power supply). Coupled in parallel with the electrodes is a voltage sensor 51, which is operative to monitor the voltage across the plates 43 and 45. Due to the random distribution of dielectric particles 14 within the substrate, passing the substrate 12 between the electrodes will modify the electric field and thereby cause the output of the voltage sensor 51 to vary as the substrate is translated between the plates and different composition portions of the substrate 12 enter and leave the electric field therebetween.

Figure 5:
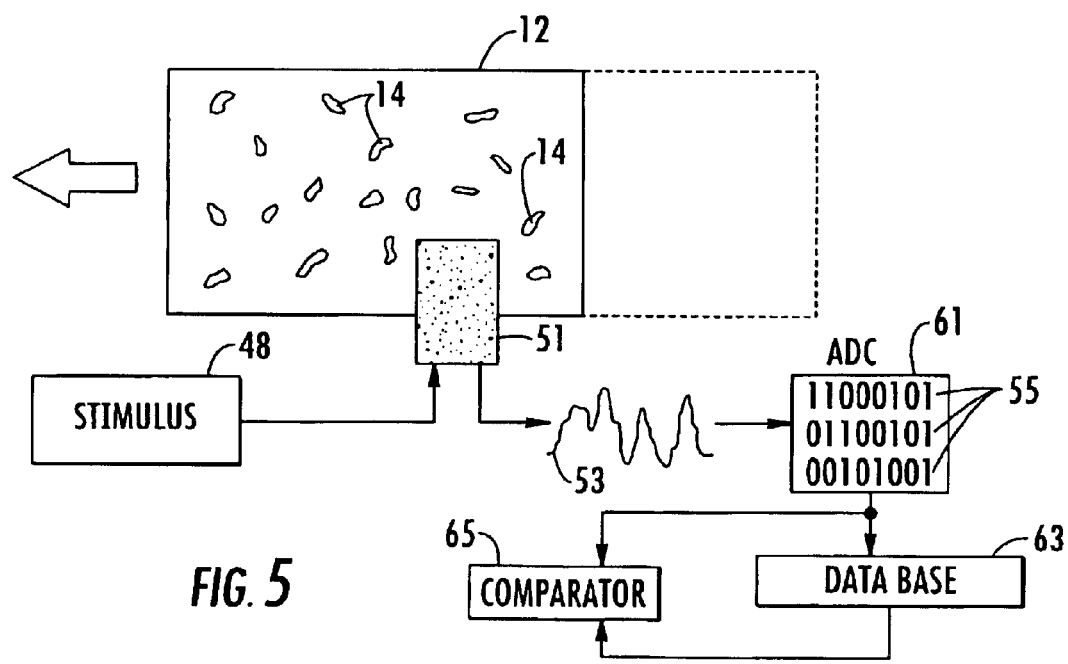
FIG. 5 shows a variation in voltage associated with the 'signature' of randomly distributed dielectric particles.

As shown in FIG. 5, as the substrate 12 is translated through an electric field generated by a stimulus 48, such as a DC source, the output voltage 53 generated by the sensor 51 will vary in proportion to the variation in capacitance of the substrate 12 associated with the 'signature' of randomly distributed dielectric particles 14. Since capacitance is proportional to induced charge and measured voltage, the voltage output of sensor 51 is proportional to the random capacitance distribution in the substrate. This output voltage 53 is digitized into a series of digital code words 55 by an analog-to-digital converter 61 and stored in a digital data base 63 at an address defined by a prescribed substrate identification feature, such as a user code, password and the like, or visible physical indicia carried by the substrate.

Because the distribution of dielectric particles 14 is fixed in a random distribution within the substrate 12, it constitutes an electronic signature that is 'unique' to that particular substrate. Electronic signature verification is readily effected by means of a comparator 65 coupled to compare the digitized output of sensor 51 with a digital code that has been stored previously in the data base 63, as described above.

Figure 6:
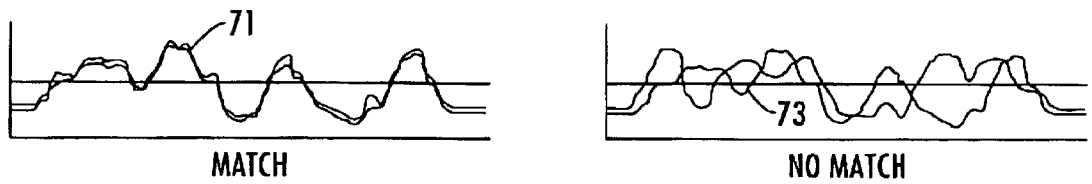
FIG. 6 shows digital signatures respectively associated with an unaltered substrate and an altered substrate.

Namely, as long as the substrate has not been physically altered, its randomly distributed capacitance characteristic will remain unchanged, so that the two digital signatures seen by the comparator 65 will effectively match one another, as shown at 71 in FIG. 6, thereby verifying authentication of the substrate. However, physical alteration of the substrate will modify the randomly distributed capacitance characteristic associated with the presence of the particles 14 within the substrate and cause the comparator 65 to be presented with two diverse digital signatures, as shown at 73.

Figure 7:
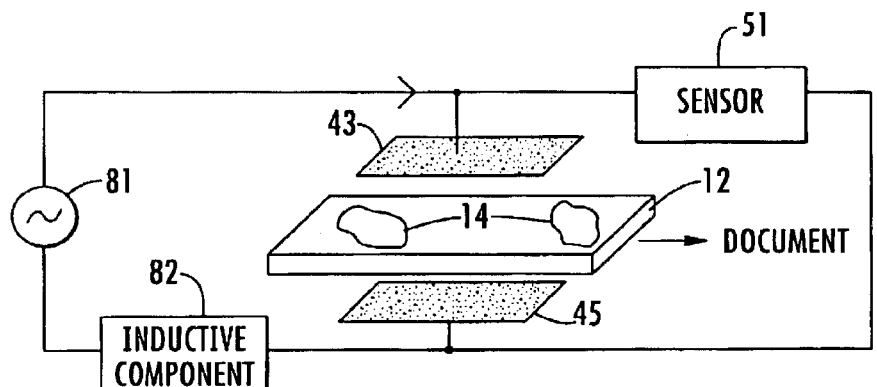
FIG. 7 shows an arrangement for detecting a variation in A.C. voltage from a substrate containing a dielectric particle-based electronic security signature in accordance with the present invention.

The manner in which the variation in capacitance along the substrate is sensed may take a number of variations. For example, as shown in FIG. 7, rather than sense a variation in D.C. voltage, as described above, a variation in A.C. voltage generated by an AC voltage generator 81 inductively coupled via inductive component 82 to the electrodes 43 and 45 may be sensed by the voltage sensor 51.

Figure 8:
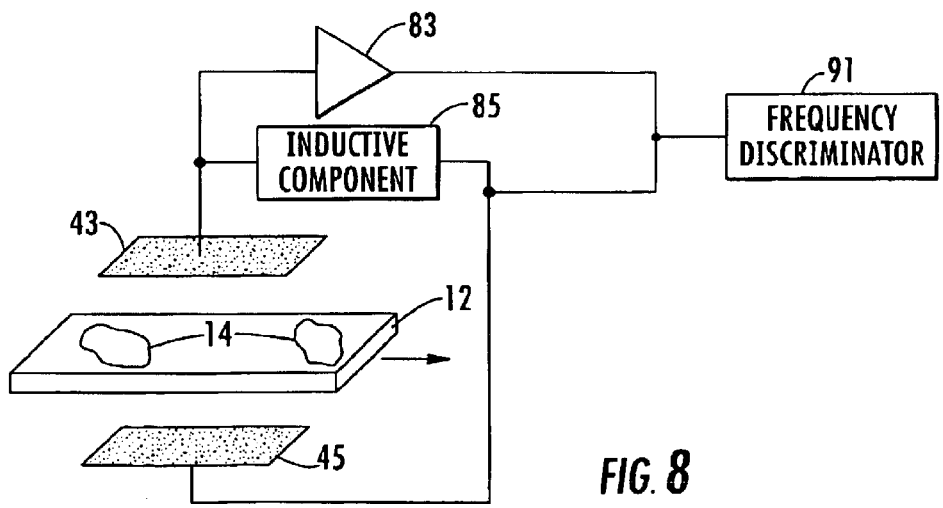
FIG. 8 shows a frequency discriminator for detecting a variation in frequency in proportion to the composite dielectric constant of randomly dispersed dielectric particles and a substrate/document proper.

As a further alternative embodiment, shown in FIG. 8, in place of a voltage sensor to measure a variation in a analog voltage between the electrodes 43 and 45, as described above, a frequency discriminator 91 may be coupled to the output of an amplifier 83, that is connected in circuit with an inductor 85 across the electrodes. In this further alternative embodiment, sensed frequency is proportional to the composite dielectric constant of the randomly dispersed dielectric particles 14 and the substrate/document layers proper.

As will be appreciated from the foregoing description, the shortcomings of conventional document verification schemes are effectively obviated in accordance with the present invention, by embedding within or depositing on a substrate/document a random distribution of dielectric particles that effectively create a unique electronically detectable signature, associated with a dielectric constant that is sufficiently larger than that of the substrate/document in which the dielectric particles are embedded, so that they exhibit molecular level electric dipole moments, to cause a detectable modification of an external electric field passing through the substrate representative of the distribution of the dielectric elements.

Electronic signature verification is readily effected by comparing the digitized output of an electric field modification sensor with a digital code that has been stored previously in the data base. As long as the substrate containing the dielectric particle signature has not been physically altered, its randomly distributed capacitance characteristic will remain unchanged, so that the two digital signatures seen by the comparator will effectively match one another, verifying authentication of the substrate. However, physical alteration of the substrate will modify the randomly distributed capacitance characteristic associated with the particles within the substrate and cause the comparator to be presented with two diverse digital signatures—indicating tampering.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of processing a substrate to impart a security identification thereto comprising the steps of:
    (a) affixing a random distribution of dielectric components with said substrate, said dielectric components having a dielectric constant sufficiently larger than that of said substrate as to exhibit molecular level electric dipole moments that cause a detectable modification of an external electric field passing through said substrate in accordance with said random distribution;
    (b) coupling said substrate, to which said random distribution of dielectric components has been affixed in step (a), with an electric field;
    (c) measuring a modification of said electric field with which said substrate is coupled in step (b), and generating an output signal representative of said modification;
    (d) storing information representative of said output signal in a storage medium separate from said substrate;
    (e) coupling said substrate, to which said random distribution of dielectric components has been affixed in step (a), with an electric field;
    (f) measuring a modification of said electric field with which said substrate is coupled in step (e), and generating an information signal representative of the measured modification; and
    (g) comparing contents of said information signal generated in step (f) with said information stored in said storage medium in step (d), to verify the validity of said substrate.

2. A method according to claim 1, wherein said distribution includes non-randomly distributed dielectric components.

3. A method according to claim 1, wherein step (g) further comprises, in response to said contents of said information signal generated in step (f) differing from said information stored in said storage medium in step (d), declaring said substrate to be invalid.

4. A method according to claim 1, wherein said substrate comprises a document.

5. A method according to claim 1, wherein said substrate comprises a plurality of substrate layers laminated together by an adhesive containing said distribution of dielectric components.

6. A method according to claim 1, wherein step (c) includes digitally encoding said output signal as a digital code representative of said modification, and step (d) comprises storing said digital code in said storage medium.

7. A method according to claim 1, wherein step (b) comprises locating said substrate between a pair of spaced apart electrodes to which a prescribed voltage is applied and effecting relative translation between said substrate and said electrodes, and step (c) comprises measuring said modification of said electric field and generating said output signal representative thereof during said relative translation.

8. A method according to claim 7, wherein said electric field comprises a alternating current (AC) electric field having a frequency established in accordance with a capacitance component associated with said substrate and an inductive component associated with an inductor coupled to said electrodes, and step (c) comprises, during said relative translation, generating said output signal representative of a variation in frequency of said output signal as a result of the presence of said dielectric material.

9. A system for providing a substrate with a security identification comprising:
    a security signature comprised of a random distribution of dielectric components affixed with said substrate, said dielectric components having a dielectric constant sufficiently larger than that of said substrate as to exhibit molecular level electric dipole moments, that cause a detectable modification of an external electric field passing through said substrate in accordance with said distribution; and
    a security signature detector configured to couple an electric field with said substrate, and being operative to measure a modification of said electric field by said random distribution of dielectric components, and to store information representative of said modification.

10. A system according to claim 9, wherein said distribution includes non-randomly distributed dielectric components.

11. A system according to claim 10, wherein said substrate comprises a document.

12. A system according to claim 9, wherein said substrate includes a plurality of substrate layers laminated together by an adhesive containing said distribution of dielectric components.

13. A system according to claim 9, wherein said security signature detector comprises a pair of spaced apart electrodes to which a prescribed voltage is applied and between which said substrate is located, said detector being operative to measure said modification of said electric field while effecting relative translation between said substrate and said electrodes.

14. A system according to claim 13, wherein said electric field comprises a alternating current (AC) electric field having a frequency established in accordance with a capacitance component associated with said substrate and an inductive component associated with an inductor coupled to said electrodes, and wherein said detector is operative to encode a variation in said frequency in accordance with said dielectric material.

15. A system for verifying the validity of a substrate, said substrate which contains a security signature comprised of a random distribution of dielectric components affixed with said substrate, said dielectric components having a dielectric constant sufficiently larger than that of said substrate as to exhibit molecular level electric dipole moments, that cause a detectable modification of an external electric field passing through said substrate in accordance with said distribution, said system comprising:

a security signature reader detector configured to couple an electric field with said substrate, and being operative to measure a modification of said electric field by said random distribution of dielectric components, and to generate an output representative of said modification; and a signature comparator, which is coupled to compare contents of said output generated by said security signature reader with stored information representative of said random distribution of dielectric components of said substrate, and to verify the validity of said substrate in response to said contents of said output generated by said security signature reader corresponding to said stored information representative of said random distribution of dielectric components of said substrate.

* * * * *